(12) United States Patent
Tomlinson et al.

(10) Patent No.: US 6,678,445 B2
(45) Date of Patent: Jan. 13, 2004

(54) DYNAMIC GAIN FLATTENING FILTER

(75) Inventors: W. John Tomlinson, Princeton, NJ (US); Valentine N. Morozov, San Jose, CA (US); Yevgeniy Churin, San Jose, CA (US); Brian Lee Heffner, Los Altos, CA (US); Long Yang, Union City, CA (US); Jinxi Shen, San Ramon, CA (US)

(73) Assignee: JDS Uniphase Corporation, San Jose, CA (US)

( * ) Notice: Subject to any disclaimer, the term of this patent is extended or adjusted under 35 U.S.C. 154(b) by 379 days.

(21) Appl. No.: 09/727,446

(22) Filed: Dec. 4, 2000

(65) Prior Publication Data

US 2002/0067887 A1 Jun. 6, 2002

(51) Int. Cl.$^7$ ................................................ G02B 6/34
(52) U.S. Cl. .......................................... 385/37; 385/10
(58) Field of Search ............................... 385/37, 10, 2, 385/4, 9, 11, 15, 16, 18, 31, 129

(56) References Cited

U.S. PATENT DOCUMENTS

| | | | |
|---|---|---|---|
| 4,707,056 A | 11/1987 | Bittner | 350/96.12 |
| 4,839,884 A | 6/1989 | Schloss | 370/3 |
| 5,233,405 A | 8/1993 | Wildnauer et al. | 356/333 |
| 5,408,481 A * | 4/1995 | Scheps | 359/326 |
| 5,414,540 A | 5/1995 | Patel et al. | 359/39 |
| 5,526,155 A * | 6/1996 | Knox et al. | 359/124 |
| 5,598,294 A * | 1/1997 | Uno et al. | 359/176 |
| 5,745,271 A | 4/1998 | Ford et al. | 359/130 |
| 5,867,264 A | 2/1999 | Hinnrichs | 356/310 |
| 5,881,199 A | 3/1999 | Li | 385/140 |
| 5,936,752 A | 8/1999 | Bishop et al. | 359/124 |
| 5,943,158 A | 8/1999 | Ford et al. | 359/295 |
| 5,960,133 A | 9/1999 | Tomlinson | 385/18 |
| 6,018,603 A | 1/2000 | Lundgren et al. | 385/33 |
| 6,081,331 A | 6/2000 | Teichmann | 356/328 |
| 6,134,359 A | 10/2000 | Keyworth et al. | 385/33 |
| 6,154,590 A * | 11/2000 | Jin et al. | 359/130 |
| 6,275,623 B1 * | 8/2001 | Brophy et al. | 359/115 |
| 6,381,072 B1 * | 4/2002 | Burger | 359/621 |
| 6,434,291 B1 * | 8/2002 | Kessler et al. | 385/24 |

* cited by examiner

*Primary Examiner*—Frank G. Font
*Assistant Examiner*—Kevin Kianni
(74) *Attorney, Agent, or Firm*—Lacasse & Associates, LLC; Randy W. Lacasse

(57) ABSTRACT

A dynamic gain flattening filter is provided that offers a smooth spectral response. The filter includes an input/output port for launching a beam of light, a dispersive element for dispersing the beam of light into a plurality of monochromatic sub-beams of light, and discrete array of controllable elements for receiving the plurality of sub-beams of light. The filter is designed such that each sub-beam of light is incident on more than one element of the discrete array for selective attenuation before being recombined by the dispersive element and redirected back to the input/output port. In another embodiment, a beam-folding mirror is provided to direct the attenuated beam to a separate output port.

20 Claims, 5 Drawing Sheets

DYNAMIC GAIN FLATTENING FILTER

FIELD OF THE INVENTION

The present invention relates to a dynamic gain flattening filter, and more specifically, to a dynamic gain flattening filter for wavelength multiplexed optical fiber communication links and networks.

BACKGROUND OF THE INVENTION

Dynamic gain equalizers (DGE) or dynamic gain flattening filters (DGFF) are frequently used in wavelength division multiplexing (WDM) fiber communication networks to equalize non-uniform signal intensity levels over a wide spectral bandwidth, which otherwise lead to transmission errors.

In particular, DGFFs are useful in WDM fiber communication networks employing erbium-doped fiber amplifiers (EDFAs) for simultaneously amplifying many signals at different wavelengths. In these networks, gain is dependent upon signal wavelength—resulting in a characteristic gain curve or spectrum. In a typical EDFA, the gain spectrum window is in the order of 30 nm (1530–1560 nm).

A challenge in DGFF design is to achieve a continuity of gain curve without ripple or discontinuities over the entire spectral window, and in particular, over a bandwidth occupied by a single channel, wherein channel bandwidths may overlap. This challenge has not been met by conventional channel power equalizers, which typically exhibit a stepped or rippled spectral response.

In U.S. Pat. No. 5,943,158 to Ford et al. there is disclosed a micro-mechanical modulator capable of producing a continuous gain spectrum. The micro-mechanical modulator is based on a mechanical anti-reflection switch (MARS) that provides a continuous, uniform optical surface. A diffraction grating disperses input light by wavelength, which is focussed by a lens into different light spots on the continuous, uniform surface. This continuous membrane is physically moved under an electrostatic force provided by a plurality of electrodes to selectively attenuate the input light by changing the spacing between the membrane and an underlying reflective surface, which changes the reflectivity of the modulator.

Although the modulator disclosed by Ford et al. provides reasonably smooth flattening, it is limited by the mechanical properties of the continuous membrane, which results in a coupling between the controls exercised by nearby electrodes, and limits the achievable spatial resolution. Thus, it does not provide the flexibility and advantages associated with the discrete arrays available for use in DGFF devices.

It is an object of the instant invention to provide a DGFF that offers smooth gain flattening and that uses a discrete array of elements.

SUMMARY OF THE INVENTION

The instant invention provides a dynamic gain flattening filter that offers a smooth spectral response. Conveniently and advantageously, the dynamic gain flattening filter of the instant invention includes currently manufactured discrete arrays for selectively attenuating a multiplexed optical signal. A dispersive element, such as diffraction grating, disperses an input beam of light into a plurality of monochromatic sub-beams. Each monochromatic sub-beam is incident on more than one element of the discrete array. Since each sub-beam of light is incident on a plurality of elements in the array, a smooth spectral response is provided at an output of the device. This is in contrast to channel equalizers that limit each sub-beam of light to be incident on a single element, which tends to provide a rippled or stepped spectral response.

In accordance with the instant invention there is provided a dynamic gain flattening filter comprising a first port for launching a beam of light comprising multiple wavelengths, a dispersive element for dispersing the beam of light into a plurality of sub-beams of light, and, a discrete array of controllable elements for receiving the plurality of sub-beams of light, wherein the dynamic gain flattening filter is designed such that each sub-beam of light is incident on more than one element of the discrete array for selective attenuation before being recombined and redirected to one of the first and a second port.

In accordance with the instant invention there is provided a dynamic gain flattening filter comprising a first port for launching a beam of light comprising multiple wavelengths, a dispersive element optically coupled to the first port for spatially dispersing the beam of light into a plurality of sub-beams, and a discrete array of controllable elements optically coupled to the dispersive element for receiving the plurality of sub-beams, wherein each received sub-beam is incident on a predetermined number of elements for providing a continuous spectral response at one of the first and a second port.

In accordance with the instant invention there is further provided a method of attenuating a multiplexed optical signal comprising launching a beam of light comprising multiple wavelengths from a first port, spatially dispersing the beam of light into a plurality of sub-beams, focussing the plurality of sub-beams onto a focal plane, receiving the plurality of sub-beams at a discrete array of controllable elements, each sub-beam incident on more than one element, selectively attenuating each sub-beam with the more than one element, and recombining the selectively attenuated plurality of sub-beams into a multiplexed beam of light and transmitting it to one of the first and a second port.

In one embodiment, the first port corresponds to the second port of a 3 port optical circulator. In another embodiment, the second port is spatially separated from the first port, and the multiplexed beam is redirect to the second port via a mirror disposed between the dispersive element and the first port. Of course other embodiments are also possible.

BRIEF DESCRIPTION OF THE DRAWINGS

Exemplary embodiments of the invention will now be described in conjunction with the drawings in which.

DETAIL DESCRIPTION

Figure 1:
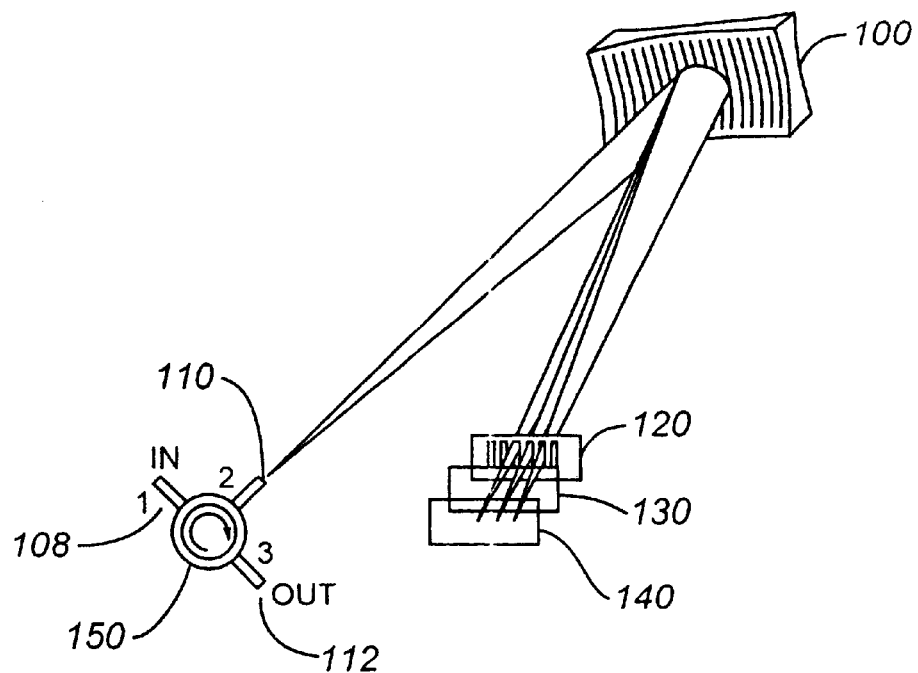
FIG. 1 is a schematic diagram illustrating a dynamic gain flattening filter (DGFF) in accordance with the instant invention.

Referring to FIG. 1, there is shown a schematic diagram of an exemplary dynamic gain flattening filter (DGFF). The DGFF includes a concave diffraction grating 100, a discrete array of controllable elements 120, a quarter-waveplate 130, a concave mirror 140, and a circulator 150.

In operation, an optical signal to be attenuated is launched into a first port 108 of the circulator 150 where it is circulated to a second port 110. The optical signal is transmitted as a beam of light from the second port 110 to the concave diffraction grating 100. The beam of light incident on the diffraction grating 100 is dispersed according to wavelength into a plurality of sub-beams of light. Each sub-beam of light is then transmitted to the discrete array 120. In accordance with the invention, each sub-beam of light is incident on more than one element of the array 120. The array 120 provides selective attenuation for each sub-beam of light incident thereon. Preferably, each liquid crystal cell is designed to attenuate the intensity of light propagating therethrough as a function of applied electrical signal/voltage. After passing through the array 120, the sub-beams are transmitted through the quarter-waveplate 130, which is provided to compensate for the polarization sensitivity of the grating 100 and/or array 120, to the concave mirror 140 disposed about a focal plane. The concave mirror 140 reflects each sub-beam directly backward through the quarter-waveplate 140 and the discrete array 120 to the diffraction grating 100. The diffraction grating recombines the attenuated sub-beams of light and returns them as a multiplexed beam to the second port 110 of the circulator 150, where it is circulated to the third port 112 to exit the device.

Figure 2:
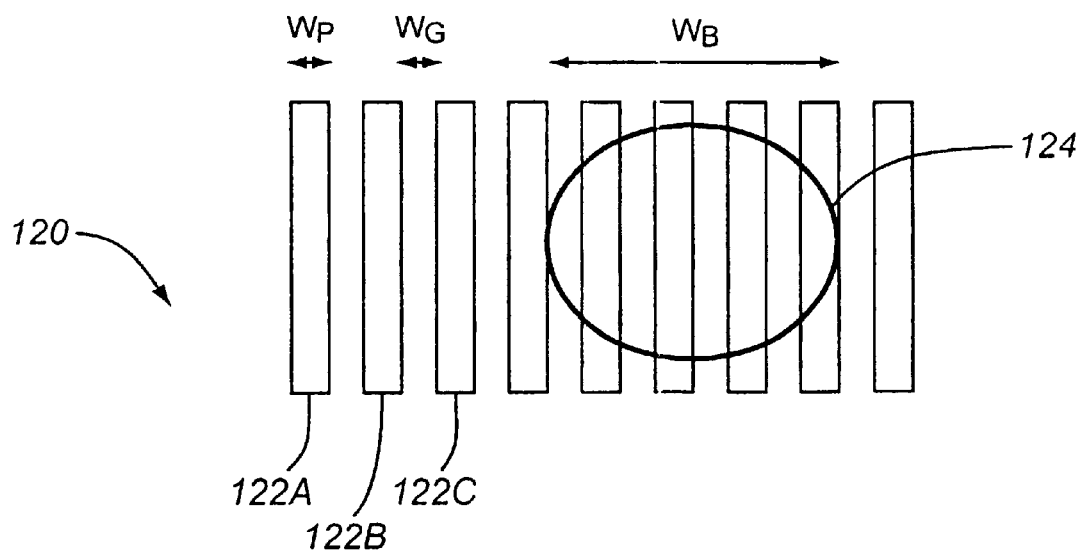
FIG. 2 is a schematic diagram illustrating a light spot covering more than one element of the discrete array shown in FIG. 1.

Referring to FIG. 2, the discrete array of controllable elements 120 is shown as an array of discrete addressable polymer dispersed liquid crystal cells or pixels. Each pixel (e.g., 122a, 122b, 122c ... ) has a fixed width, $W_P$ and is separated from an adjacent pixel by a finite gap or spacing having a width, $W_G$. Preferably, the width of the gap $W_G$ is less than 10% of the smallest width $W_P$. Together, $W_P$ and $W_G$ determine the resolution of the array (e.g., number of pixels per inch). Preferably, each polymer dispersed liquid crystal cell is designed to attenuate light by scattering the incident light to angles outside the range of angles designed to be coupled back to the circulator by the concave diffraction grating 100. The amount of scatter is controlled by the electric field across each pixel, allowing control of the effective attenuation.

Preferably, the resolution of the array 120 is selected such that each monochromatic sub-beam of light produced by the diffraction grating 100 is incident on the array 120 as a light spot 124 with the diameter $W_B$ at $e^{-2}$ intensity level covering a plurality of elements, as shown in FIG. 2. For example, the minimum width $W_P$ of a pixel in the array 120 is selected to be substantially smaller than a diameter of a light spot produced by a single monochromatic sub-beam, $W_B$. Conveniently, the spectral resolution bandwidth of the array 120 is defined herein as the physical width of a pixel ($W_P$) plus the width of a gap ($W_G$), divided by the spectral dispersion of the grating at the discrete array. For example, if the pixel width is 70 $\mu$m, the gap width is 5 $\mu$m, and the dispersion is 50 $\mu$m/nm, the spectral resolution bandwidth of the array is 1.5 nm.

Alternatively, the position of the attenuators array relative to the diffraction grating (defocus) or the spatial resolution of optical system is selected such that each sub-beam of light is incident on more than one element of the array 120. Conveniently, the spectral resolution bandwidth of the diffraction grating is defined herein as the physical width of a monochromatic sub-beam $W_B$ at the discrete array (which we characterize by its full width at $e^{-2}$ of its peak intensity), times the spectral dispersion at the discrete array. For example, if the width of the monochromatic sub-beam is 150 $\mu$m, and the dispersion is 50 $\mu$m/nm, the spectral resolution bandwidth of the grating is 3 nm.

In accordance with the instant invention, the spectral resolution bandwidth of the array is selected to be smaller than the spectral resolution bandwidth of the grating. Accordingly, the ratio of the spectral resolution bandwidth of the grating to the spectral resolution bandwidth of the array, denoted by W, is greater than one. For example, in one embodiment the distance between the diffraction grating and the array is reduced such that light dispersed by the diffraction grating is diffuse and/or unfocused when it reaches the array, and thus is incident on more than one element of the array.

Since each sub-beam of light is incident on more than one element of the array 120, a controllable and continuous wavelength transmission function for gain flattening that varies smoothly over a specific bandwidth is achieved.

FIGS. 3–6 illustrate the results of model computations performed to illustrate the significance of the instant invention.

Figure 3:
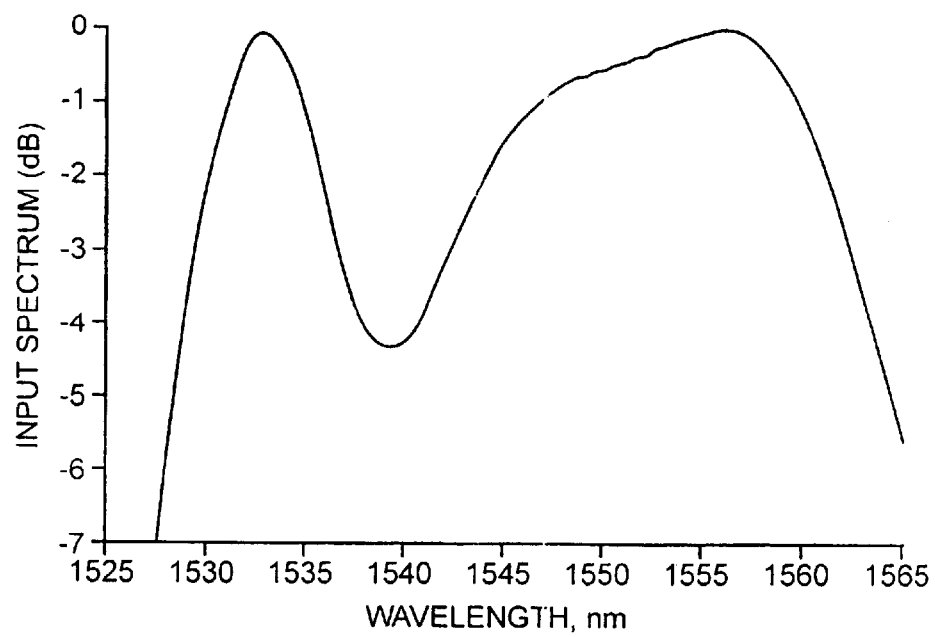
FIG. 3 is an input spectrum used to model EDFA gain spectral dependence.

Referring to FIG. 3, an input spectrum to be attenuated is shown to resemble a gain profile of a conventional EDFA. The exemplary spectrum is normalized such that its maximum value is 0 dB.

Figure 4:
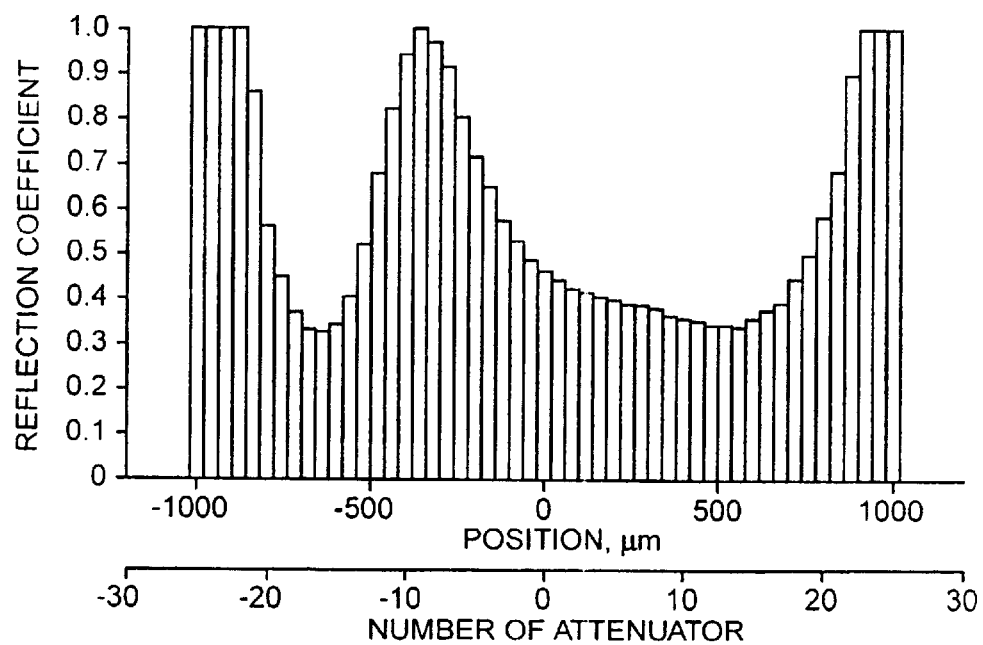
FIG. 4 is a graph showing the reflection coefficients for a 50 pixel array used in modeling the flattening of the spectrum presented in FIG. 3.

In performing the model calculations, the discrete array is assumed to be a liquid crystal array operating in reflection mode and having 50 pixels. Each pixel is assumed to have a width/pitch of 40 $\mu$m and a gap between adjacent pixels $W_G$=5 $\mu$m. The diameter of the light beam at the array (i.e., the light spot) is assumed to be 100 $\mu$m. The linear dispersion at the array is assumed to be 50 $\mu$m/nm. With these parameters, the spectral resolution bandwidth of the array is 0.9 nm, and the spectral resolution bandwidth of the grating is 2.0 nm, and thus the bandwidth of the grating is about 2.2 times that of the array (i.e., W=2.2). The reflection coefficients used for each element in the modeling are shown in FIG. 4.

Figure 5:
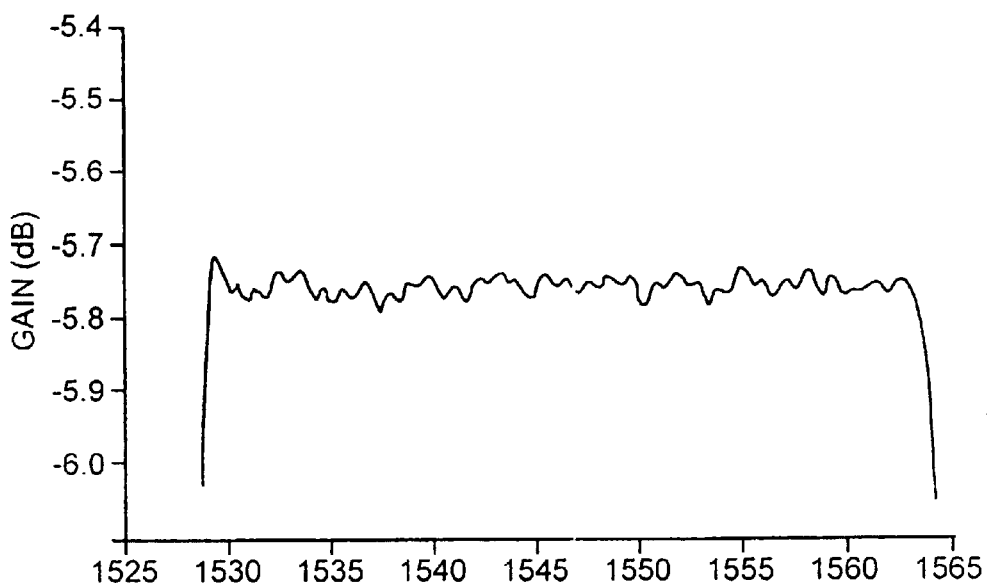
FIG. 5 illustrates the pass band flattening achieved using the coefficients in FIG. 4.

FIG. 5 illustrates the pass band flattening accomplished with the above statistics. Notably, the spectral response is substantially flat and continuous over the entire spectral range.

Of course, the definition of a smooth and/or flat spectral response is dependent upon the spectral range of interest. For example, the spectral range could be substantially greater than the channel spacing (e.g., 0.8 nm in typical WDM systems) or substantially smaller than or equal to the channel spacing. Similarly, the smoothness of the response is dependent upon the magnitude of the signal to be attenuated and the degree of attenuation required.

Figure 6:
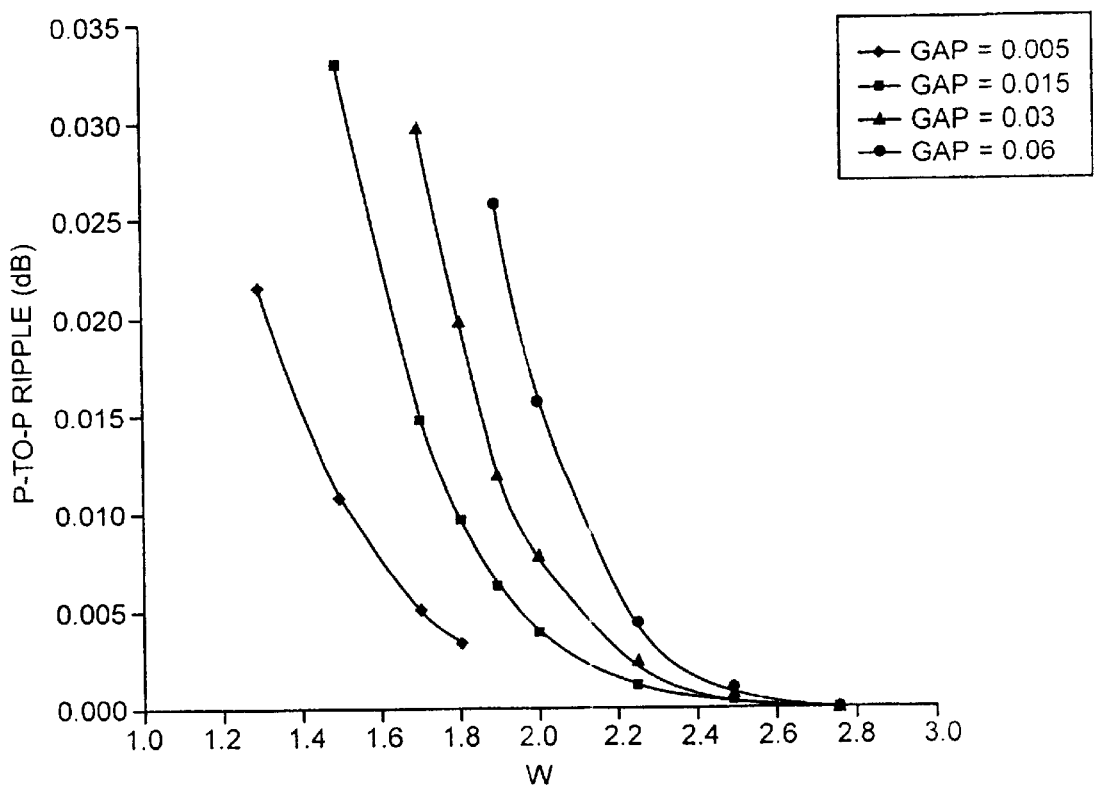
FIG. 6 is a graph showing the dependence of peak-to-peak ripple on the ratio of the resolution bandwidth of the grating to that of the array.

Model calculations to determine the number of pixels, the approximate beam diameter of a monochromatic light spot on the array, and the resolution of the diffraction grating required for smooth spectral response have been performed. Some results of these calculations are shown in FIG. 6, which plots the peak-to-peak ripple in the response of a DGFF (in dB) as a function of the ratio of the resolution bandwidth of the grating to that of the array, W, for typical values of a gap width parameter, defined as gap=$W_G/(W_P+W_G)$. In these calculations, it was concluded that the ratio of resolution bandwidth of the grating to that of the array, W, is preferably greater than about 1.75, and more preferably between about 2 and about 3, however, lower or higher values are equally possible. Moreover, it was found that the number of pixels and/or linear dispersion and spatial resolution of optical system could be selected to meet the desired spectral resolution requirements and/or ripple requirements for the gain flattening filter.

Notably, the optical arrangement illustrated in FIG. 1 is presented for exemplary purposes only. Variations and modifications of the dynamic gain flattening filter will be apparent to those skilled in the art. For example, the discrete array is not limited to a liquid crystal array. Exemplary examples of other discrete arrays include polymer dispersed liquid crystal arrays and reflective micro electromechanical switches (MEMS). Two preferred optical arrangements are depicted in FIGS. 7 and 8.

Figure 7:
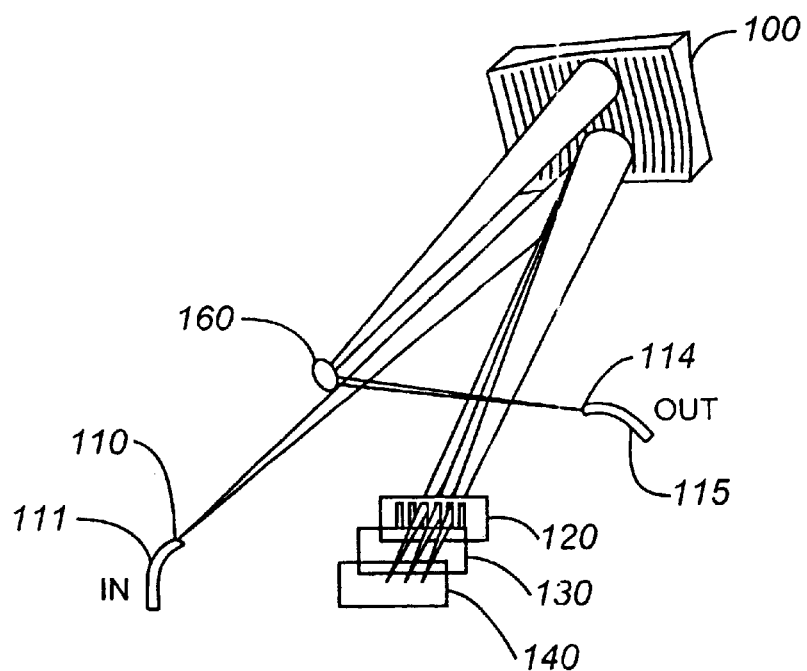
FIG. 7 is a schematic diagram of a DGFF in accordance with another embodiment of the invention.

Referring to FIG. 7, there is illustrated a dynamic gain flattening filter similar to the one shown in FIG. 1. In particular, the concave diffraction grating 100, the discrete array of controllable elements 120, the quarter-waveplate 130, and the concave mirror 140 are the same as the concave diffraction grating 100, the discrete array of controllable elements 120, the quarter-waveplate 130, and the concave mirror 140 shown in FIG. 1. However, in this embodiment separate input 110 and output 114 ports for coupling to input 111 and output 115 optical waveguides, respectively, function as the circulator 150 in FIG. 1. Furthermore, a beam-folding mirror 160 is disposed between the input port 110 and the diffraction grating 100. The mirror 160 and input 111 and output 115 optical waveguides are arranged such than an input beam of light launched from port 110 is not blocked from reaching the diffraction grating 100, and such than an attenuated output signal recombined at the diffraction grating 100 is redirected to the second port 114. Advantageously, the embodiment shown in FIG. 7 reduces insertion loss due to a double pass through the circulator.

Figure 8:
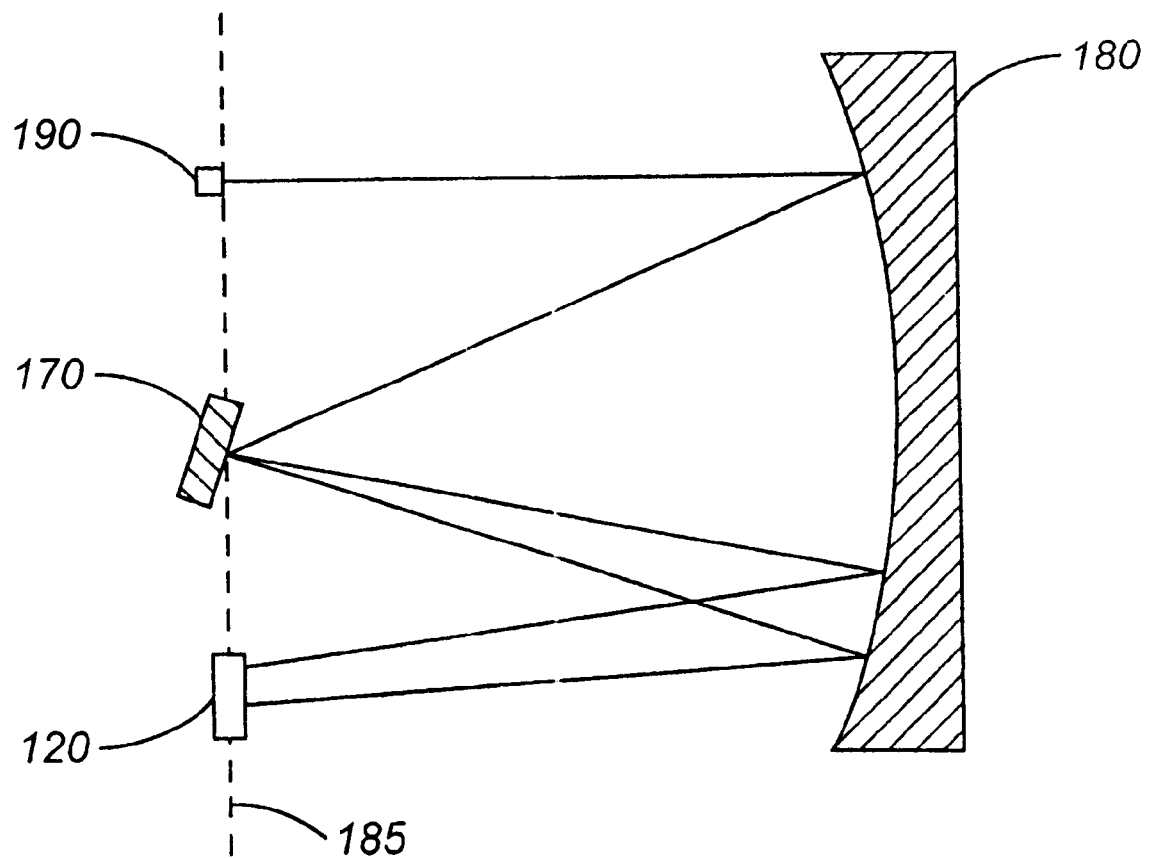
FIG. 8 is a schematic diagram of a DGFF in accordance with yet another embodiment of the invention.

Referring to FIG. 8, there is shown a dynamic gain flattening device in accordance with another embodiment of the instant invention, wherein the concave grating is replaced with a plane grating 170 and a spherical mirror 180. Similarly, the polarization compensation function of the half-wave plate is accomplished with a front-end unit 190 that provides light having a predetermined polarization. Each of the front end unit 190, the diffraction grating 170, and the discrete array 120, which for exemplary purposes is a reflective MEMS array, are disposed about a focal plane 185 of the spherical mirror 180. Greater detail of this optical arrangement is disclosed in U.S. Pat. Ser. No. 60/183,155, incorporated herein by reference.

The term MEMS, or Micro Electro-Mechanical Systems, refers to very small mechanical devices and systems constructed using photolithography and various deposition and etching techniques. Generally, MEMS range in size from a few microns to a few millimeters. Motors, pivots, and rotating mirrors can be implemented using a number of MEMS microfabrication technologies, such as silicon surface micromachining, LIGA, silicon bulk micromachining, electro-discharge machining and others. Micromechanical parts tend to be rugged, respond rapidly, use little power, and are produced at large quantities at low cost owing to their planar lithographic fabrication process.

Any MEMS device including an array of closely spaced mirrors whose reflectivity or orientation is individually controlled is suitable for use with the DGFF of this invention. For example, a planar array of mirrors, each of which pivots about an axis along the plane of the substrate, can reflect the incident light to angles outside the range of angles designed to be coupled back to the input/output port. Alternatively, an array of blocking fingers in front of a common mirror is used to block the reflected beams, either by absorbing the beams or by reflecting them at large angles that do not couple back to the input/output port. Another alternative is a pixel array of multilayer Fabry-Perot etalons, whose spacing between reflective layers is varied to change the reflectivity of the pixel at the wavelength directed to it by the grating (e.g., the concave holographic grating 100 in FIG. 1). The Fabry-Perot etalon is discussed further in section 7.6 of Max Born and Emil Wolf, *Principles of Optics*, $6^{th}$ edition, Pergamon Press, 1980, incorporated herein by reference.

Polymer dispersed liquid crystals (PDLC) are light-scattering materials that operate on the principle of electrically modulating the refractive index of a liquid crystal to match or mismatch the refractive index of an optically isotropic, transparent solid, for example, a microporous polymer film. PDLCs may be formed, for example, by phase separation of a nematic liquid crystal from a polymer solution to form droplets of uniform size and controlled density. The PDLC's consist of micron size droplets of a low molecular weight liquid crystal dispersed in a polymer binder. The size of the nematic droplets is on order of the wavelength of the light. Because of the droplet size and the refractive index mismatch between the liquid crystal in the droplet and the polymer binders, the films can efficiently scatter light. A PDLC film is sandwiched between substrates having transparent conducting electrodes, such as indium tin oxide. The applied electric field aligns the droplets so that their refractive indices match that of the polymer, changing the scattering by the droplets. Thus, the level of scattered light depends on applied voltage. Since the droplets are randomly oriented in the polymer, polarization dependence of the scattered light is typically very low. To form an array of individually addressable pixels, one or more substrates, having an array of transparent pixel electrodes and a means to connect the electrodes to control electronics, is used to allow local electric fields to individually control the scattering at each pixel.

Of course, numerous other embodiments may be envisaged, without departing from the spirit and scope of the invention. For example, although the basic functionality of the instant invention is generally referred to as equalizing or flattening signal intensity levels, it should be understood that in some systems the desired functionality is to obtain a specified pattern of non-equal signal intensity levels, such as a linear ramp, and that the instant invention is equally applicable in such situations.

What is claimed is:

1. A dynamic gain flattening filter comprising:
    a first port for launching a beam of light comprising multiple wavelengths;
    a dispersive element for dispersing the beam of light into a plurality of sub-beams of light; and,
    a discrete array of controllable elements for receiving the plurality of sub-beams of light, wherein the dynamic gain flattening filter is designed such that each sub-beam of light is incident on more than one controllable element of the discrete array for selective attenuation before being recombined and redirected to one of the first and a second port.

2. A dynamic gain flattening filter as defined in claim 1, wherein one of a spectral resolution bandwidth of the discrete array and a spectral resolution bandwidth of the dispersive element is selected in dependence upon the other for providing a substantially smooth spectral response at one of the first and second output ports.

3. A dynamic gain flattening filter as defined in claim 2, wherein the dispersive element comprises a diffraction grating.

4. A dynamic gain flattening filter as defined in claim 3, wherein the discrete array of controllable elements comprises a liquid crystal array.

5. A dynamic gain flattening filter as defined in claim 3, wherein the discrete array of controllable elements comprises a polymer dispersed liquid crystal array.

6. A dynamic gain flattening filter as defined in claim 3, wherein the discrete array of controllable elements comprises a MEMS device.

7. A dynamic gain flattening filter as defined in claim 3, wherein the diffraction grating comprises a concave diffraction grating.

8. A dynamic gain flattening filter as defined in claim 7, wherein the discrete array of controllable elements is disposed about a focal plane of the concave diffraction grating.

9. A dynamic gain flattening filter as defined in claim 3, comprising a spherical reflector for optically coupling the first port to the diffraction grating and the diffraction grating to the discrete array of controllable elements.

10. A dynamic gain flattening filter as defined in claim 9, wherein the discrete array of controllable elements is disposed about a focal plane of the spherical reflector.

11. A dynamic gain flattening filter as defined in claim 3, wherein the first and second ports are coupled to first and second optical waveguides, respectively.

12. A dynamic gain flattening filter as defined in claim 11, wherein the first and second ports are spatially separated.

13. A dynamic gain flattening filter as defined in claim 3, wherein the first port comprises the second port of a three port optical circulator.

14. A dynamic gain flattening filter comprising:
   a first port for launching a beam of light comprising multiple wavelengths;
   a dispersive element optically coupled to the first port for spatially dispersing the beam of light into a plurality of sub-beams; and
   a discrete array of controllable elements optically coupled to the dispersive element for receiving the plurality of sub-beams,
   wherein each received sub-beam is incident on a predetermined number of elements for providing a continuous spectral response at one of the first and a second port, the predetermined number of elements greater than one.

15. A dynamic gain flattening filter as defined in claim 14, wherein the predetermined number of elements is greater than about 1.75.

16. A dynamic gain flattening filter as defined in claim 15, wherein the predetermined number of elements ranges from about 2 to about 3.

17. A dynamic gain flattening filter as defined in claim 16, wherein the first port comprises the second port of a three port optical circulator.

18. A method of attenuating a multiplexed optical signal comprising:
   launching a beam of light comprising multiple wavelengths from a first port;
   spatially dispersing the beam of light into a plurality of sub-beams;
   focussing the plurality of sub-beams onto a focal plane;
   receiving the plurality of sub-beams at a discrete array of controllable elements, each sub-beam incident on more than one element;
   selectively attenuating each sub-beam with the more than one element; and
   recombining the selectively attenuated plurality of sub-beams into a multiplexed beam of light and transmitting it to one of the first and a second port.

19. A method of attenuating a multiplexed optical signal as defined in claim 18, wherein the discrete array of controllable elements is disposed about the focal plane.

20. A method of attenuating a multiplexed optical signal as defined in claim 18, wherein the discrete array of controllable elements is disposed off the focal plane such that the dispersed light is defocused on the discrete array of controllable elements.

* * * * *